Fig. 8.

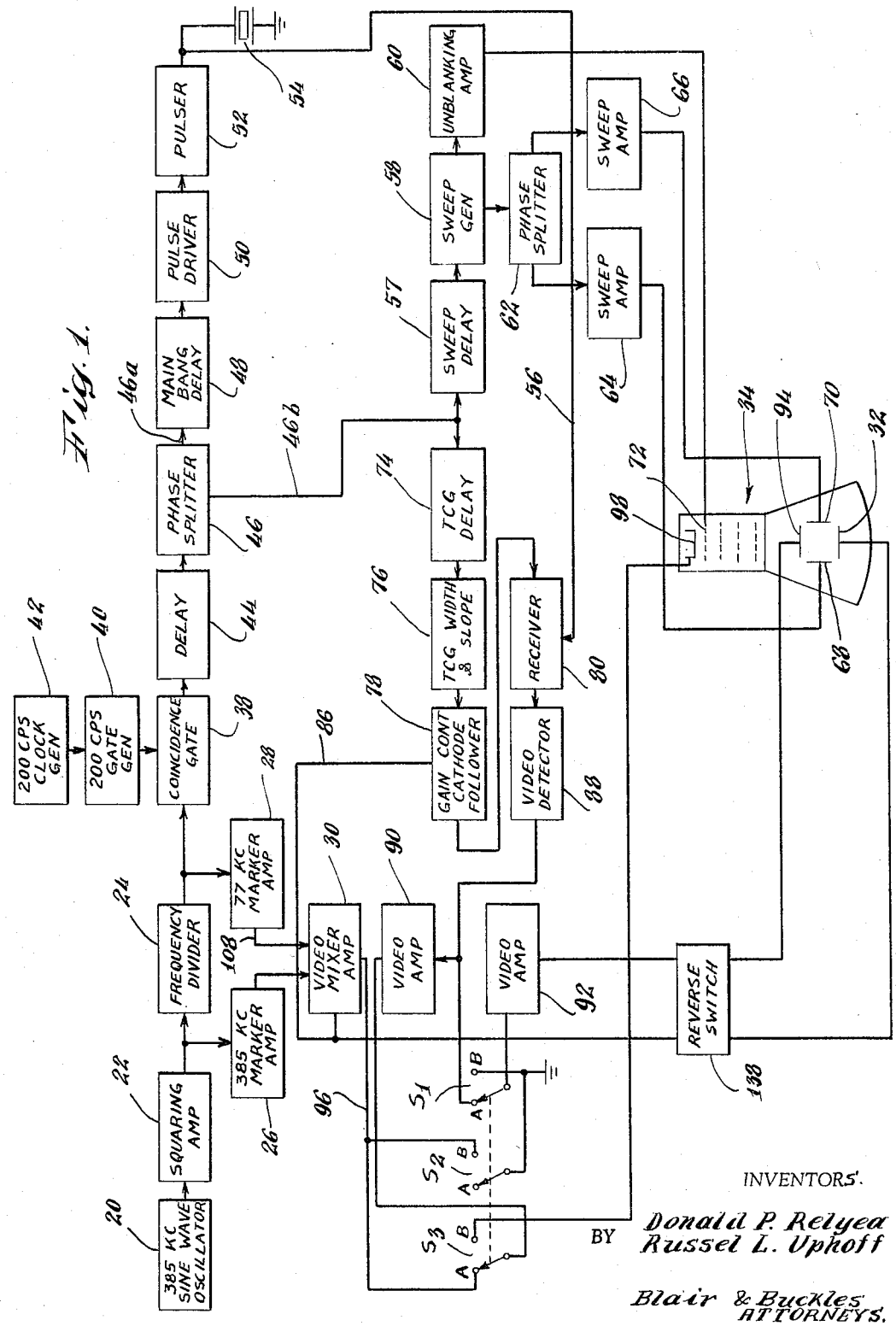

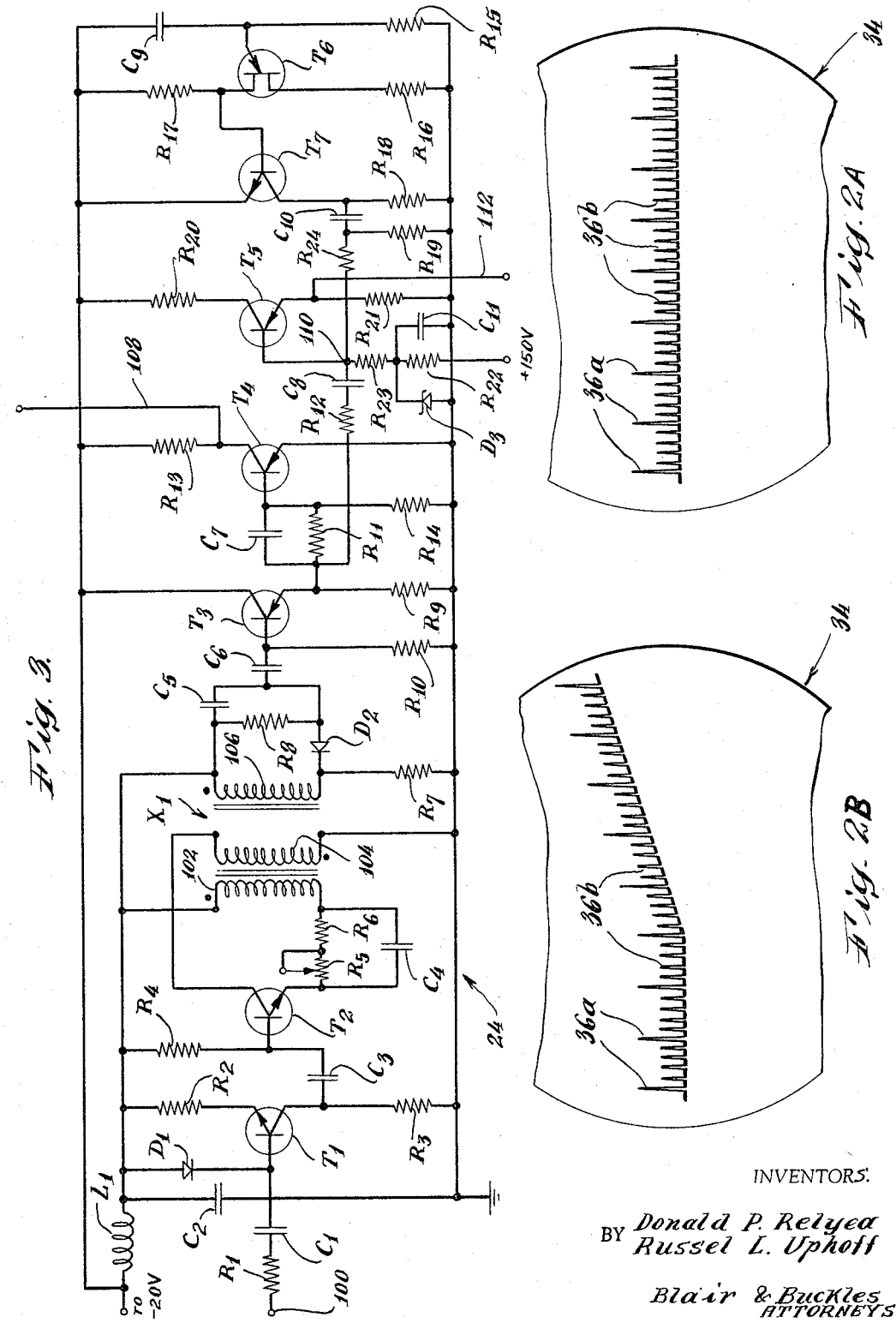

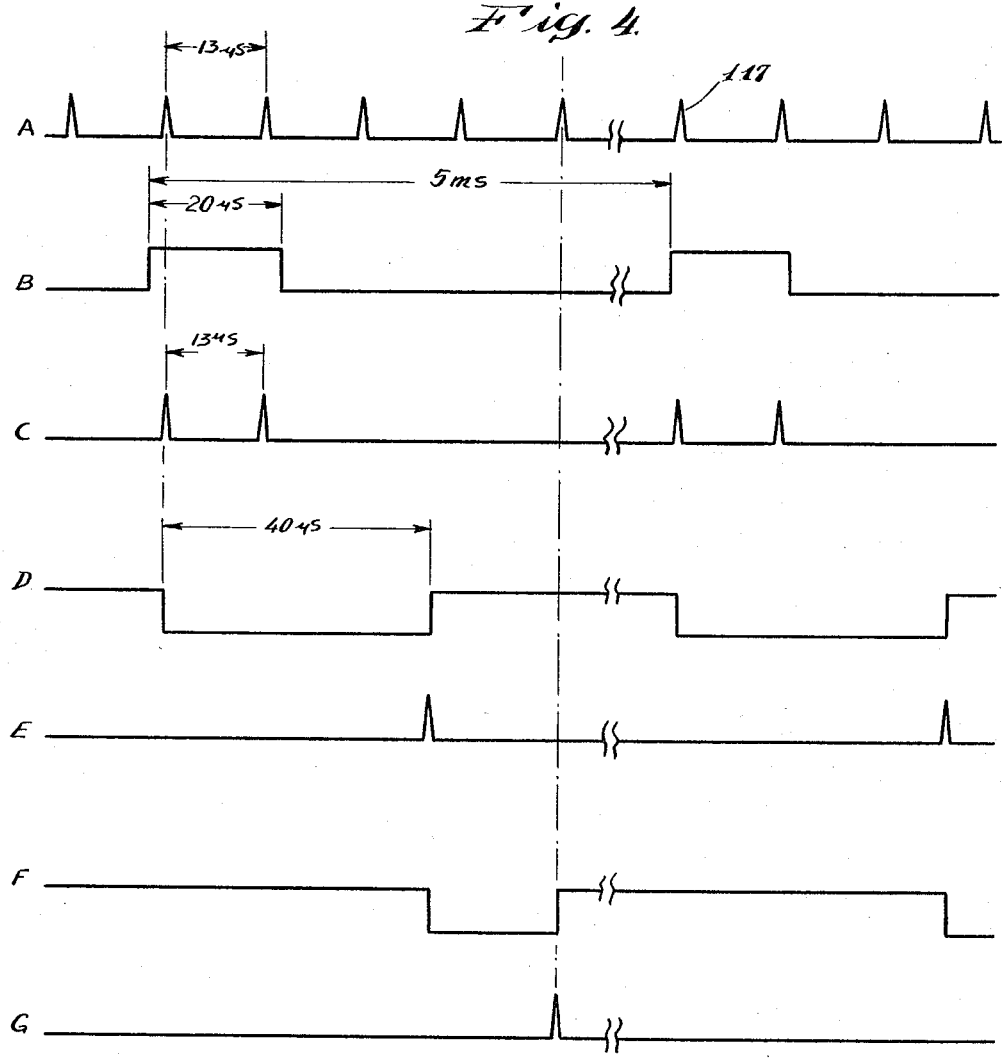
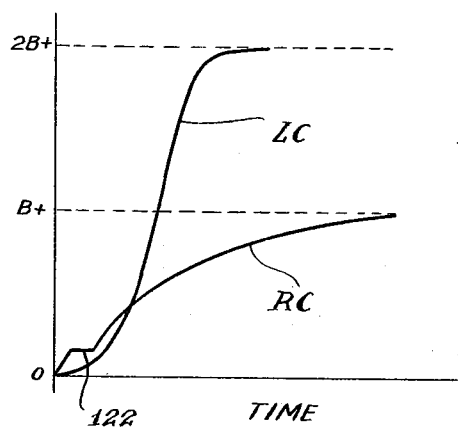

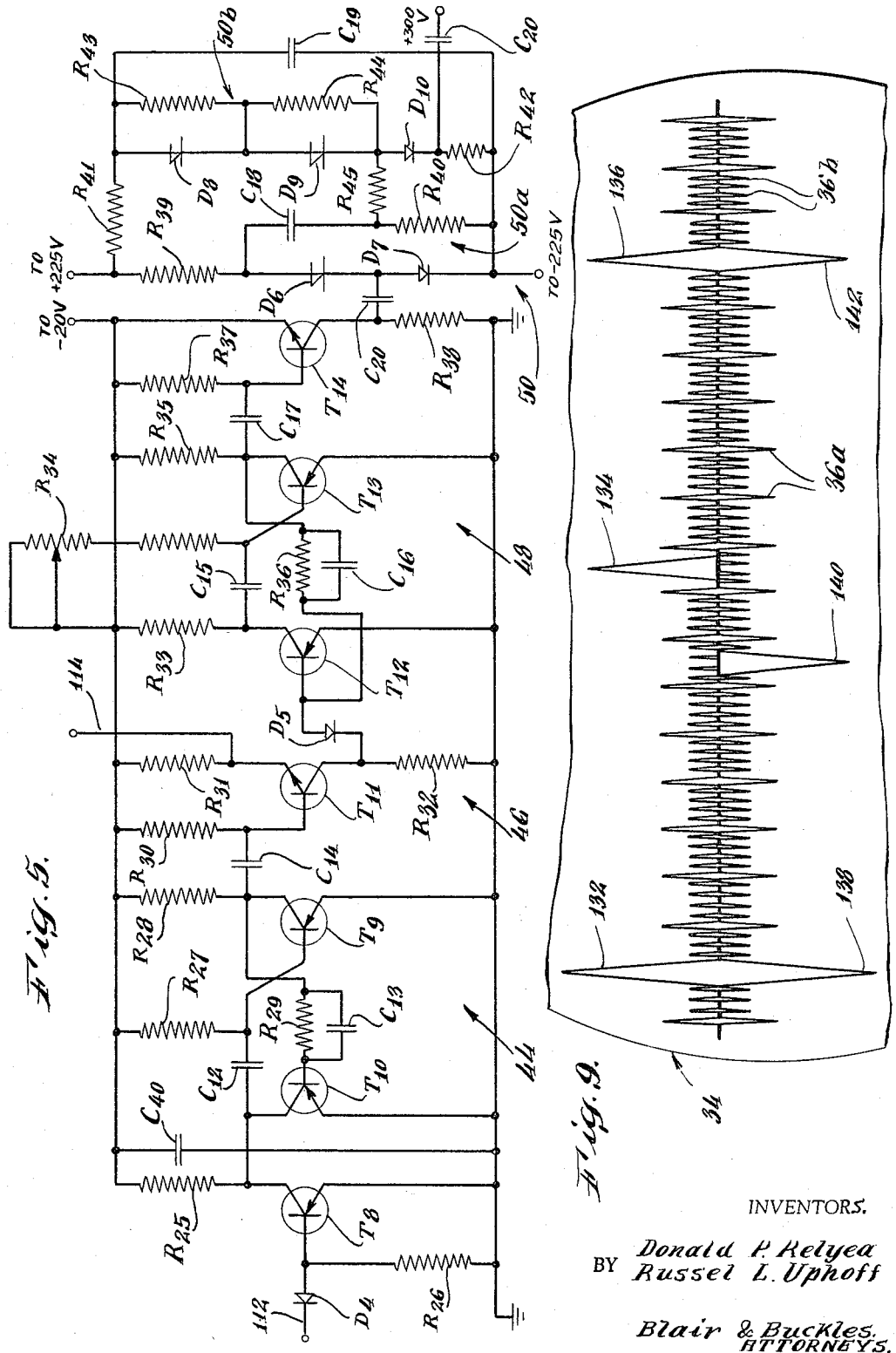

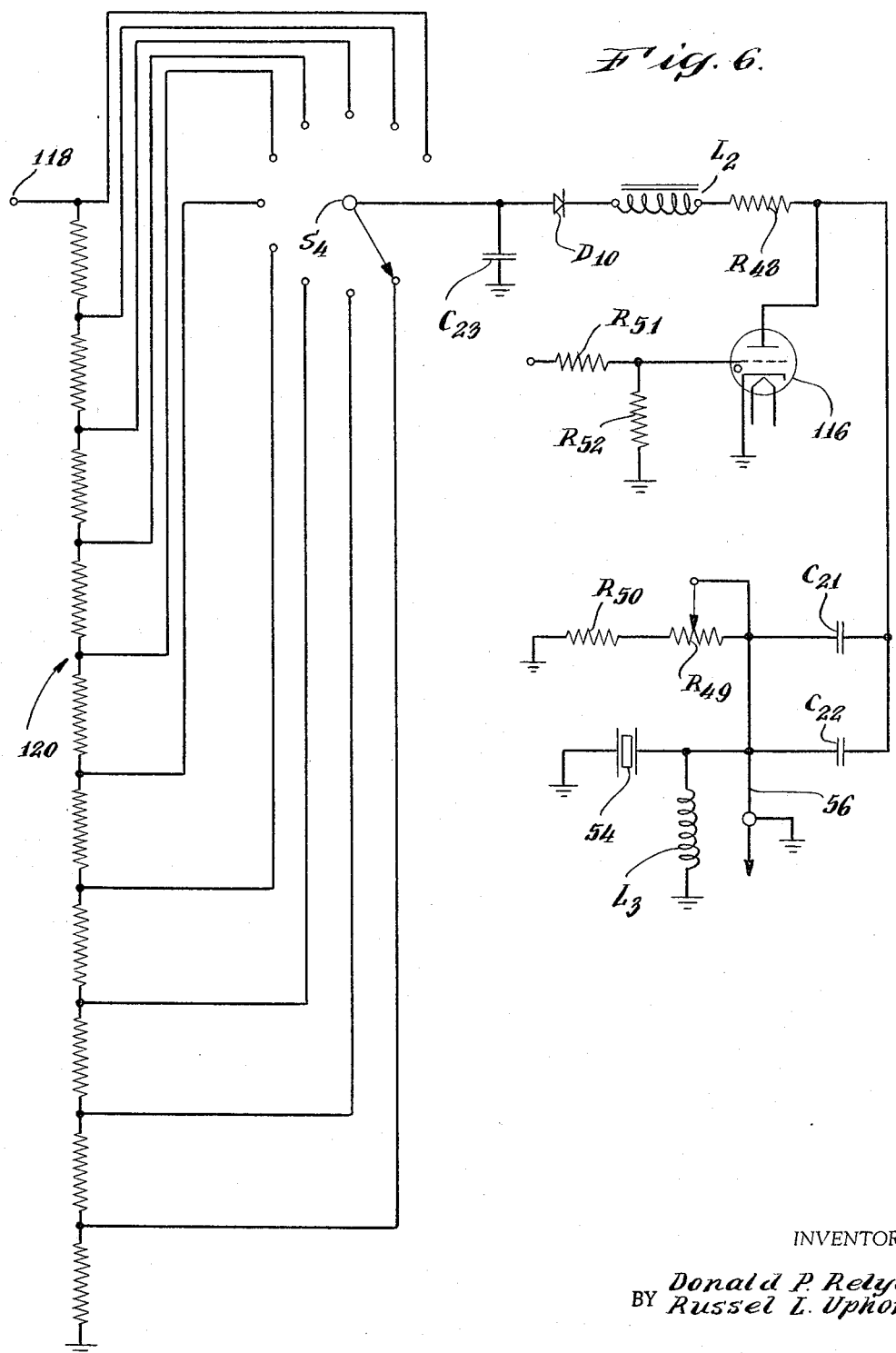

United States Patent Office 3,287,962
Patented Nov. 29, 1966

3,287,962
ULTRASONIC INSPECTION APPARATUS
Donald P. Relyea, 25 Lincoln Ave., South Norwalk,
Conn., and Russel L. Uphoff, 122 Hannah's Road,
Stamford, Conn.
Filed Dec. 26, 1963, Ser. No. 335,711
6 Claims. (Cl. 73—67.9)

The present invention relates to the field of ultrasonics. Particularly, it relates to an improved ultrasonic inspection apparatus for generating and detecting ultrasonic energy, and for electronically displaying signals corresponding to such generation and detection of ultrasonic energy.

One particularly successful application of ultrasonics is in the area of inspection and flaw detection of materials. A piezoelectric crystal is pulsed electrically to develop ultrasonic energy which is introduced into the material under test. When the ultrasonic energy, in propagating through the material, encounters discontinuities such as flaws, a portion of the ultrasonic energy is returned to the original point of entry. The piezoelectric crystal, being a reciprocal transducer, responds to the returning energy or echo to develop electrical signals. These electrical signals provide an indication of the presence of flaws in the material, as may result from improper founding, for example.

These signals resulting from echoes may be processed and appropriately recorded or displayed in relation to time and the position of the transducer to determine rather precisely the exact locations of the flaws within the material. Moreover, the magnitude of the echoes and the resulting electrical signals provide some degree of indication of the character and extent of individual flaws. In addition, the transducer may be translated from point to point in scanning fashion about the surface of the material under inspection such that a composite record or display portrays the internal character of a test body in the manner analogous to X-rays. This technique has been used on livestock to determine the extent of fatty tissue.

In recent years there have been investigations directed to the use of ultrasonics in the field of medicine. It has been found that relatively high levels of ultrasonic energy have a therapeutic effect on certain body organs and their functions. Moreover the use of relatively low levels of ultrasonic energy have been found to be an extremely valuable diagnostic tool. Taking advantage of the principles outlined for the inspection of materials, ultrasonic energy has been used to diagnose brain tumors, heart ailments and to detect kidney stones for example.

The use of ultrasonic energy as a diagnostic tool offers many advantages over other known diagnostic techniques. Ultrasonic energy, unlike X-rays, has no known potential danger. The diagnostic use of ultrasonic energy reduces the need for complicated diagnostic techniques involving contrast media, arterial puncture or anesthesia. It is painless and involves little discomfort for the patient.

It is an object of the present invention to provide an improved high resolution ultrasonic inspection apparatus having general application in the area of flaw detection and particular application to diagnostic medicine.

It is a further object to provide an ultrasonic inspection apparatus adapted to present test results in a manner conducive to ready interpretation and evaluation.

It is an additional object to provide an improved ultrasonic inspection apparatus capable of automatically compensating for the effects of attenuation on the ultrasonic energy being propagated through a test body. An included object is to provide novel synchronizing means for completely coordinating the operations of circuit components of an ultrasonic inspection apparatus.

An additional object is to provide an ultrasonic inspection apparatus of extreme reliability for diagnosing internal body lesions, and which is readily operated by nontechnical personnel to rapidly develop test results in a form readily evaluated.

A further object is to provide a diagnostic tool which is inexpensive, uncomplicated to operate, reliable and safe; and which is portable such that it may be readily used with minimum discomfort to the patient.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a block circuit diagram of an embodiment of the present invention.

FIGURES 2A and 2B depict displays obtained on the face of a cathode ray tube employed in the invention.

FIGURE 3 is a detailed schematic circuit diagram of a portion of the invention shown in FIGURE 1.

FIGURES 4A through 4G depict the timing relationship between the signals developed by the various circuit components shown in FIGURE 1.

FIGURE 5 is a detailed schematic circuit diagram of a portion of the invention shown in FIGURE 1.

FIGURE 6 is a detailed schematic circuit diagram of the pulser device shown in FIGURE 1.

FIGURE 7 depicts charging curves associated with the operation of the circuit in FIGURE 6.

FIGURE 8 is a detailed schematic circuit diagram of the time compensated gain control circuits (TCG) of FIGURE 1; and FIGURE 9 is a graphic illustration of the display on the face of a cathode ray tube developed by the application of the invention as a diagnostic tool.

*General description*

In general the invention provides an ultrasonic inspection apparatus. Although the invention will be described in terms of its application in the field of diagnostic medicine, it has general application to the detection of flaws in any material capable of supporting the propagation of sonic energy. Referring to FIGURE 1, a sine wave oscillator 20 constitutes the basic clock source for the system and is preferably a high-stability self-excited transistorized oscillator such as disclosed in the "Military Standardization Handbook—Selected Semiconductor Circuits," MIL-HDBK-215, June 15, 1960, pages 5–12, 5–13. According to an important feature of our invention, the frequency of the oscillator 20 is chosen to have a convenient relationship to the velocity of propagation of the sonic energy in the material under test. In the examination of the human body for example, it has been determined that the period of a 385 kc. signal corresponds to the time required for two-way propagation of ultrasonic energy through 2 millimeters of flesh. The velocity of sound in human tissue is equal to $1.54 \times 10^6$ millimeters per second. Accordingly, the time required for sound to penetrate 2 millimeters of tissue and an echo to return through 2 millimeters of tissue is 2.6 microseconds, which corresponds to the period of a cycle of a 385 kc. signal. The significance of this relationship will become apparent in the description to follow.

The output sine wave from oscillator 20 is shaped in a squaring amplifier 22 and fed jointly to a frequency divider 24 and to a 385 kc. marker pulse amplifier 26. The blocking oscillator 24 functions as a frequency divider to provide an output pulse for every five pulses received on its input. Accordingly, the output from frequency divider 24 being fed to marker amplifier 28 is reduced to a frequency of 77 kc.

The outputs from marker amplifiers 26 and 28 in the form of spiked pulses are fed jointly to a video mixer-amplifier 30 whose output is fed directly to a vertical deflection plate 32 of a cathode ray tube (CRT) indicated schematically at 34. The effect of the 385 kc. marker pulses and the 77 kc. marker pulses on the trace of the CRT 34 is as indicated in FIGURE 2A. The larger vertical deflections 36a arise from the application of the 77 kc. spiked pulses, hereinafter called major marker pulses, to deflection plate 32. The 385 kc. spiked pulses are attenuated to a greater extent in the mixer-amplifier 30 than the major marker pulses causing the shorter vertical deflections 36b. The resulting deflections 36a and 36b of the sweep generate a range scale on the face of the CRT 34, with the increment between adjacent markers 36b corresponding to 2 millimeters of flesh while the increment between deflections 36a corresponds to 1 centimeter of flesh. It is understood that the above is merely exemplary and should not be considered as limiting the invention. The utility of this advantageous feature will become more apparent from the description to follow.

The 77 kc. spiked pulse output from the frequency divider 24 is also fed to one input of a coincidence gate 38. The other input to the coincidence gate 38 is derived from a 200 c.p.s. gate pulse generator 40 energized by a 200 c.p.s. clock generator 42. The output pulses from gate generator 40 are of sufficient width to ensure that at least one pulse from frequency divider 24 is passed through coincidence gate 38 to trigger a delay multivibrator 44. The delay multivibrator 44 operates to provide a single clock pulse each time that the coincidence gate 38 is enabled by the gate generator 40. These clock pulses from delay multivibrator 44 are fed to a phase splitter 46 which in turn develops, in response to each input pulse, a negative clock pulse on line 46a and a positive clock pulse on output line 46b.

The negative clock pulses on output line 46a trigger a delay multivibrator 48. The time delay introduced by the delay multivibrator 48 is adjusted such that each output pulse is in time coincidence with one of the major marker deflections 36a (FIGURE 2A) developed during each sweep of the CRT trace. These clock pulses from delay multivibrator 48 trigger a pulser driver 50 which in turn energizes a pulser 52.

The pulser 52 develops a high amplitude voltage pulse, hereinafter referred to as the "main bang" pulse, which energizes a piezoelectric crystal or transducer 54 mechanically coupled to the object under test (not shown). The ultrasonic energy developed by the transducer 54 in response to each "main bang" pulse is introduced into the test body. In ultrasonic inspection of the intracranial region, for example, the transducer 54 is merely held firmly against the skull. During the interval between "main bang" pulses, the transducer 54 responds to the echoes returning to the point of entry of the ultrasonic energy. At a 200 c.p.s. pulsing rate, there is ample time for the sonic energy to propagate to the opposite side of the skull and return to the original point of entry. Yet, this pulsing rate is sufficiently rapid to provide a persistent display on the CRT 34. The transducer 54 responds to sonic echoes by generating voltage pulses which are fed to a receiver 80 over line 56. Each "main bang" pulse is also fed over line 56 to the receiver circuits.

Still in connection with FIGURE 1, the positive spiked pulses on line 46b are fed to a sweep delay circuit 57, such as transistorized delay multivibrator. Sweep delay 57 is adjusted to provide a shorter delay than the delay instituted in the clock pulses by the "main bang" delay 48 so as to insure that the sweep is initiated prior to the generation of each "main bang" pulse. The output from the sweep delay 57 triggers a sweep generator 58 which, in turn, produces an output to an unblanking amplifier 60 and a linear sawtooth output to a phase splitter 62. The positive and negative sawtooth outputs from phase splitter 62 are amplified in separate sweep amplifiers 64 and 66 and applied to horizontal deflection plates 68 and 70 of CRT 34 to produce the CRT beam sweep in the familiar push-pull fashion. The sweep time is adjusted so as to insure that all echoes will have returned to the transducer 54 prior to the termination of the sweep. Unblanking amplifier 60 provides an output to a grid 72 of the CRT 34 for intensifying the electron beam during the sweep. On completion of the sweep, the output from the unblanking amplifier 60 terminates to blank out the retrace.

Figure 8:
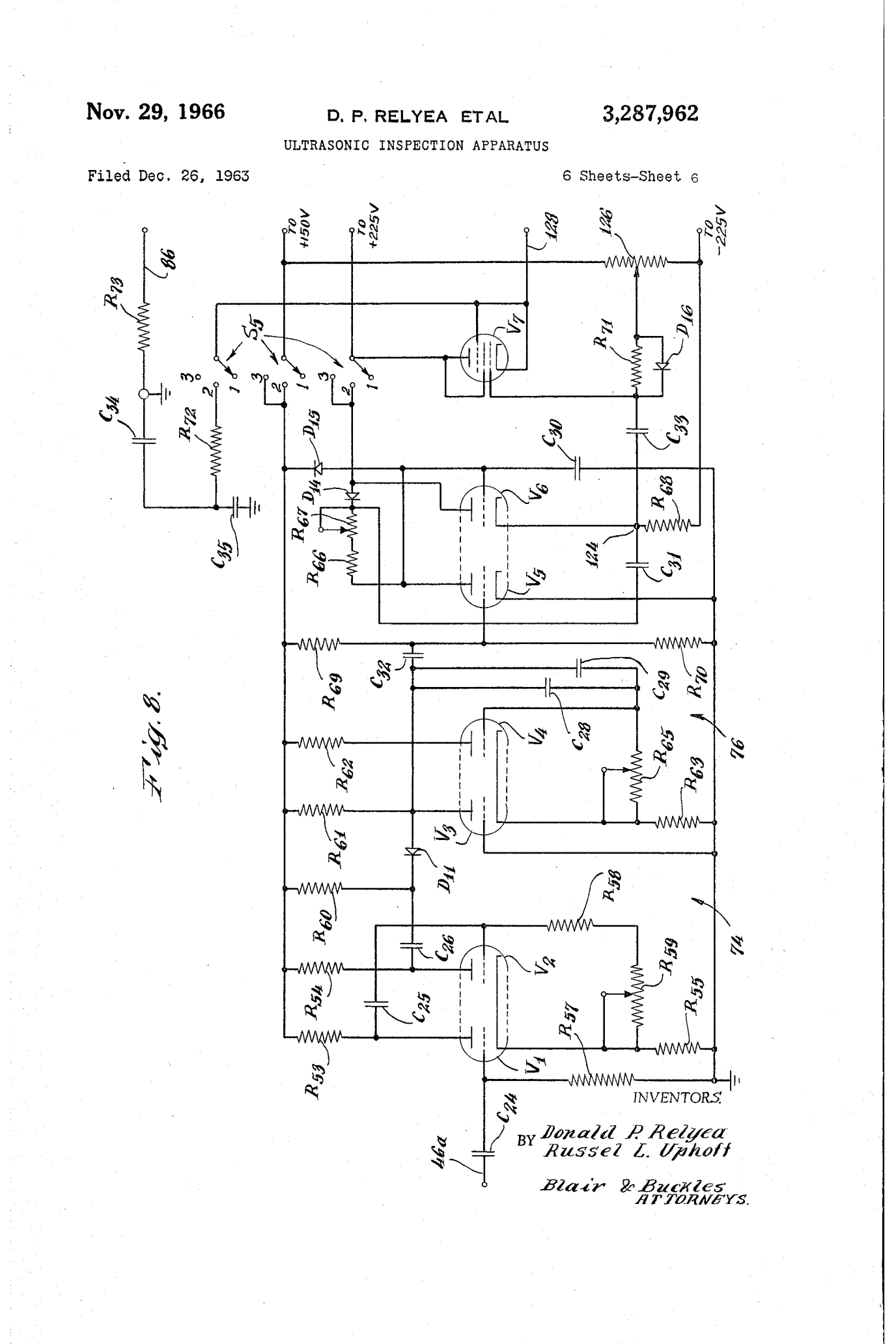

Still referring to FIGURE 1, the positive spiked pulses on line 46b are fed to the input of a time compensated gain control network (TCG) including a TCG delay circuit 74, a TCG width and slope control circuit 76 and a fine gain control cathode follower circuit 78. The output from the cathode follower circuit 78 is fed as a gain control signal to the amplifying circuits of the receiver 80. The echo responses from the transducer 54 on line 56 are coupled to the input of the receiver 80. The operation of the time compensated gain (TCG) network will be detailed in connection with FIGURE 8. Its purpose is to control the gain in the amplifying circuits of the receiver 80 so as to selectively amplify the pulses appearing on line 56 in accordance with their time relationship to the "main bang" pulse. Specifically the TCG network operates to increase the receiver gain as a function of time in order that pulses on line 56 due to echoes returning from flaws located remote from the transducer 54, which, due to greater attenuation, are necessarily weaker in magnitude than pulses due to echoes originating from flaws closer to the transducer, are amplified to a greater degree. This important feature insures that the receiver circuits will not be swamped by the "main bang" pulse or echoes returning from points close to the transducer and yet are capable of detecting weak echoes originating from points remote from the transducer.

The output from the receiver 80 is applied to a video detector 88, such as a diode detector whose output is fed to a video amplifier 90 and through the A contact of a mode switch S1 to a video amplifier 92. The output from video amplifier 92 is fed to the other deflection plate 94 of the CRT 34. The output from video amplifier 90 is applied to the wiper of a mode switch S3. The A contact of mode switch S3 is applied over a line 96 as a third input to video mixer-amplifier 30. When mode switches S1 and S3 are in the A mode, e.g., switched to the A contacts, video amplifier 90 functions as an inverter and the outputs from video amplifiers 30 and 92 applied to vertical plates 32 and 94, respectively, function in push-pull fashion to display the echo responses.

In some circumstances, it may be desirable to convert from deflection modulation (A mode) of the CRT trace to intensity modulation (B mode). This would be particularly desirable if the transducer were translated or scanned about the test object and a composite record obtained such as with a time exposure photograph of the CRT display. With deflection modulation, such a composite record would be practically uninterpretatable. If intensity modulation is used however, as the transducer is scanned the various echo responses would show up as intensified spots on the photograph rather than a mass of vertical deflections. Intensity modulation produces a composite record of the cross-section of the test object much like that of X-ray photographs.

Accordingly, with mode switches S1 and S3 contacting their respective B contacts, the input circuit to video amplifier 92 is broken and the output from video amplifier 90 is fed to the cathode 98 of the CRT to intensify the electron beam for each echo response. A mode switch S2, ganged with switches S1 and S3, applies ground potential on line 96 to disable video mixer-amplifier 30.

*Synchronizing network*

Turning to FIGURE 3, the frequency divider 24 includes an input transistor T1 and a transformer coupled transistor T2 which functions as a blocking oscillator. The 385 kc. spiked pulse train at input terminal 100 is communicated to the base of transistor T1 through resistor R1 and coupling capacitor C1. A negative power supply of 20 volts is applied through an RF filtering network, including a series choke L1 and a bypass capacitor C2 to ground, and a resistor R2 to the emitter of transistor T1. The collector of transistor T1 is returned to ground through a resistor R3. A diode clamp D1 is connected between the base of transistor T1 and the negative power supply.

The collector of transistor T1 is coupled through capacitor C3 to the base of transistor T2 with the base also connected to the negative supply through the choke L1 and a resistor R4. The emitter of transistor T2 is connected to the negative supply through winding 102 of a transformer X1 and an RC network including resistors R5 and R6 paralleled by a capacitor C4. The collector of transistor T2 is returned to ground through a second winding 104 of transformer X1.

The initial positive pulse of the 385 kc. pulse train applied to the base of transistor T2 from the collector of input transistor T1 turns transistor T2 on, causing collector current to flow through transformer winding 104. The resulting pulse induced in transformer winding 102 is applied as regenerative feedback to the emitter through capacitor C4 and resistors R5, R6 driving transistor T2 into saturation so as to insure rapid and complete charging of capacitor C4. The charge on capacitor C4 applies a voltage at the emitter which is positive with respect to the base so as to block transistor T2 from again going into conduction on application of succeeding pulses to its base. Capacitor C4 discharges at a rate determined by the resistance value of resistors R5 and R6. Once the voltage at the emitter falls below a predetermined level, transistor T2 is again unblocked and will be triggered into conductance by a pulse at its base. Adjustment of R5 determines the time duration that transistor T2 will be blocked and, by the same token, the frequency relationship between its input and output. According to the present invention, resistor R5 is adjusted such that transistor T2 will be triggered by every fifth pulse in the 385 kc. pulse train. Blocking oscillator 24 thus provides one output pulse for every five input pulses.

The collector current flowing in transformer winding 104 resulting from the initial pulse and each succeeding fifth pulse of the 385 kc. pulse train applied to the base of transistor T2 induces an output pulse in a third winding 106 of transformer X1. One side of this third winding 106 is connected through the RF choke L1 to the negative supply and the other side is returned to ground through resistor R7. The output pulses at winding 106 having a pulse repetition rate of 77 kc. (385 divided by 5) are shaped into negative spikes by a diode D2, a resistor R8 and a capacitor C5 for application through coupling capacitor C6 to the base of emitter follower transistor T3. The collector of transistor T3 is connected directly to the negative supply, the emitter is returned to ground through a resistor R9 and the base is connected to ground through a biasing resistor R10.

The negative spikes at the emitter of transistor T3 are fed jointly to the base of transistor amplifier T4 through the parallel combination of a resistor R11 and a capacitor C7, and to the base of a gate transistor T5 through resistor R12 and capacitor C8. The transistor amplifier T4 corresponds to the 77 kc. marker amplifier 28 and may be similar to the 385 kc. marker amplifier 26 (FIGURE 1); and the gate transistor T5 corresponds to the coincidence gate 38 (FIGURE 1).

The collector of transistor amplifier T4 is connected through dropping resistor R13 directly to the negative supply, the emitter is grounded and the base is connected to ground through biasing resistor R14. The amplified 77 kc. major marker pulses at the collector of transistor T4 are fed over line 108 to the video amplifier-mixer 30 (FIGURE 1).

Still in reference to FIGURE 3, a unijunction transistor T6 is energized so as to operate as the 200 c.p.s. oscillator 42 (FIGURE 1). Accordingly, the emitter of unijunction transistor T6 is connected to the —20-volt supply through a capacitor C9 and to ground through a resistor R15. Its base one terminal is returned through resistor R16 to ground while the base two terminal is connected to the —20-volt supply by a resistor R17.

In operation, capacitor C9 charges through resistor R15 raising the voltage at the emitter to a level such that unijunction transistor T6 breaks down. Capacitor C9 then discharges through the emitter base two circuit of unijunction T6 and resistor R17 providing an output pulse for application to the base of a transistor T7. Once capacitor C9 is discharged, unijunction transistor T6 reverts to its nonconductive state and capacitor C9 is recharged through resistor R15 initiating the next cycle. The oscillating frequency of operation of unijunction transistor T6 is determined by the resistance value of resistor R15.

The transistor T7 has its emitter connected directly to the —20-volt supply while its collector is coupled to ground through a pulse shaping network including a capacitor C10 and resistors R18 and R19. The 200-cycle pulses at the base of transistor T7 give rise to square wave pulses at the output of the pulse shaping network. This circuitry corresponds to the gate generator 40 of FIGURE 1. These 200-cycle negative 20-volt pulses having a pulse duration of approximately 20 microseconds are fed to the base of gate transistor T5. The collector of gate transistor T5 is connected through resistor R20 to the —20-volt supply while its emitter is grounded through resistor R21.

A +150-volt biasing source is connected through resistors R22 and R23 to terminal 110 in the base circuit of gate transistor T5. A Zener diode D3 and a filtering capacitor C11 connected in parallel from the junction between resistors R22 and R23 to ground serve to clamp terminal 110 to a fixed off-biasing potential of +19 volts. The 200-cycle —20-volt pulses applied to terminal 110 through resistor R24 serve to override this fixed biasing potential thereby enabling gate transistor T5 for any 77 kc. pulses occurring during the duration of the —20-volt pulse.

As more clearly seen in FIGURE 4, each —20-volt pulse (FIGURE 4B) is of sufficient width (20 microseconds) so as to coincide in time with one and possibly two pulses of the 77 kc. pulse train (FIGURE 4A); the interval between pulses being approximately 13 microseconds. Thus at least one and possibly two pulses (FIGURE 4C) of the 77 kc. pulse train are rendered effective by each —20-volt enabling pulse to trigger gate transistor T5 for providing output pulses on line 112 at essentially a 200-cycle rate.

Turning to FIGURE 5, the negative output pulses from gate transistor T5 on line 112 are fed through a diode D4 to the base of a high gain input transistor T8. The collector is connected through a resistor R25 to a —20-volt supply while the emitter is tied directly to ground. A filtering capacitor C40 is connected between the negative supply line and ground. The anode of diode D4 is connected to ground through a resistor R26. The negative input pulses at the base of input transistor T8 give rise to positive-going pulses at its collector. These positive-going pulses are coupled through a capacitor C12 to the base of a transistor T9. Transistor T9 and a transistor T10 are cross-coupled so as to function as the delay multivibrator 44 shown in FIGURE 1.

Transistor T9 is normally conducting by virtue of a biasing resistor R27 connected between its base and the −20-volt supply. The positive-going pulses applied through capacitor C12 cuts transistor T9 off causing the potential at its collector to fall from ground to −20-volts as determined by the negative power supply applied through a resistor R28. This negative-going pulse is coupled back through a resistor R29 and capacitor C13 to the base of transistor T10, driving it into saturation. Capacitor C12 starts charging through the emitter-collector circuit of transistor T10 and resistor R27 toward the −20-volt potential of the supply voltage until transistor T9 is again biased into conduction. The voltage at the collector of transistor T9 swings positively to ground which, coupled back over the cross-coupling path including resistor R29 and capacitor C13, drives transistor T10 to cut off. The parameters of the capacitor C12 and resistor R27 determine the time duration that transistor T9 is non-conducting and thus the time delay between the input triggering pulse from input transistor T8 and the positive swing of the collector voltage at transistor T9.

In the instant application, delay multivibrator 44 is adjusted to provide a delay of approximately 40 microseconds which is sufficient to insure that only the first of a possible two pulses passing through coincidence gate 38 during each cycle is effective to trigger the delay multivibrator 44; it being noted that, since the transistor T9 has already been rendered non-conductive by the first occurring pulse, a second occurring pulse will have no effect on the delay multivibrator operation. This relationship is graphically illustrated in FIGURES 4C and 4D.

It has been found necessary to employ a high gain input transistor T8, such as a 2N191 or its equivalent, to insure a substantially constant triggering input to the delay multivibrator 44. Should the triggering inputs vary in amplitude, for example, the time delay instituted by the delay multivibrator 44 will not remain constant. Since the delayed pulses are used to synchronize the sweep circuits for the CRT 34 as well as the pulsing circuitry for the piezoelectric crystal 54 (FIGURE 1), time variations between these pulses will result in considerable "jitter" in the display on the face of the CRT 34.

It has been found that variations in the triggering pulses arise where the gate transistor T5 (FIGURE 3) passes only a portion of one of the pulses in the 77 kc. pulse train such as would occur if the gate transistor is enabled during the occurrence of a pulse. In such event, the output pulse on line 112 would be severely stunted as compared to a normal pulse passed by the gate transistor T5 sometime after it was enabled. By using a high gain input transistor T8, even a stunted pulse at its base is sufficient to drive it into saturation and consequently its output is substantially identical regardless of the character of its input.

Still in reference to FIGURE 5, the positive rise of the potential at the collector transistor T9 is differentiated by a capacitor C14 and a resistor R30 to develop positive voltage spikes at a frequency of 200 cycles for application to the base of a transistor amplifier T11. The emitter of transistor T11 is connected through a resistor R31 to the negative supply voltage and its collector is connected to ground through a resistor R32. On occurrence of the positive voltage spikes at its base, transistor T11 goes into conduction providing positive voltage spikes at its emitter for application over line 114 to the sweep circuits and TCG circuits (FIGURE 1), and negative voltage spikes at its collector for application to the base of transistor T12 through diode D5. Transistor thus functions as a phase splitter and corresponds to phase splitter 46 of FIGURE 1.

Transistor T12 along with cross-coupled transistor T13 form a delay multivibrator corresponding to the "main bang" delay 48 of FIGURE 1. Transistors T12 and T13 operate in substantially the same fashion as do transistors T9 and T10 of delay 44 (FIGURES 1 and 5). Transistor T12 is triggered into conduction by a negative spike at its base. The positive voltage swing at the junction between its collector and a resistor R33 is coupled by a capacitor C15 to the base of transistor T13 driving it to cut off, transistor T13 being normally conductive by virtue of an adjustable pot R34. Capacitor C15 begins to discharge through the emitter-collector circuit transistor T12 at a rate determined by the adjustment of pot R34. Once the voltage at the base of transistor T13 falls sufficiently negative, it breaks into conduction bringing the junction between its collector and a resistor R35 positively to ground potential. This positive swing is coupled over cross-coupling path including a capacitor C16 and a resistor R36 to drive transistor T12 to cut off.

The pot R34 is manually adjusted to vary the delay of the "main bang" delay 48 so as to achieve time coincidence between each "main bang" pulse and a major marker 36a portrayed on the face of the CRT 34 (FIGURE 2).

The positive voltage swing of the collector of transistor T13 is differentiated by a capacitor C17 and a resistor R37 to provide positive voltage spikes at a frequency of 200 cycles for application to the base of a transistor amplifier T14. The emitter of transistor amplifier T14 is tied to the negative 20-volt supply while its collector is grounded through a resistor R38. The output on the collector of transistor T14 is in the form of negative voltage spikes having a −20-volt peak.

These voltage spikes having a repetition rate of 200 c.p.s. are used to synchronize a free running Shockley oscillator, indicated generally at 50a, which in turn triggers a second Shockley oscillator, indicated generally at 50b. Oscillators 50a and 50b, in combination, function as the pulser driver 50 of FIGURE 1. Free-running oscillator 50a includes the series combination of a resistor R39, a 50-volt Shockley diode D6 and a diode D7 connected between a +225-volt supply and a −225-volt supply. A capacitor C18 in series with a resistor R40 is connected across diodes D6 and D7.

The triggered oscillator 50b includes, in series, a resistor R41, a pair of 200-volt Shockley diodes D8 and D9, a diode D10 and a small output resistor R42 connected between the +225-volt supply and the −225-volt supply. A capacitor C19 is connected from the anode of Shockley diode D8 to the −225-volt supply. Each of the Shockley diodes D8 and D9 are shunted by a pair of equal valued resistors R43 and R44 to insure equal distribution of potentials across each Shockley diode.

In operation, capacitor C18 of free-running oscillator 50a charges to the 50-volt breakdown potential of Shockley diode D6 in slightly more than 0.005 second, the time interval between pulses of the 200 c.p.s. train of pulses at the collector of transistor T14. These −20-volt spikes are coupled to the cathode of Shockley diode D6 by a capacitor C20. Blocking diode D7 permits the cathode of Shockley diode D6 to be pulled down in potential such that, in combination with the voltage across the capacitor C18, the breakdown voltage is exceeded. Capacitor C18 then discharges through Shockley diode D6 and diode D7 giving rise to a −50-volt pulse at the upper terminal of resistor R40. It will thus be seen that the operation of the free-running oscillator 50a is synchronized to the 200 c.p.s. frequency of the pulses at the output of transistor T14.

In the quiescent state of oscillator 50b, capacitor C19 charges to approximately 360 volts which is insufficient to break down the series connected Shockley diodes D8 and D9. An application of the −50-volt pulse through a resistor R45 to the cathode of Shockley diode D9, the combined breakdown potential of both Shockley diodes is exceeded. The discharging of capacitor C19 through Shockley diodes D8 and D9, diode D10 and resistor R42 develops a +300-volt triggering pulse coupled by a capacitor C20 to the grid of a thyratron 116 (FIGURE 6) in the pulser circuit 52.

Referring to both FIGURE 4 and FIGURE 5, the input pulses to transistor amplifier T8 are shown in FIGURE 4E and the output from the "main bang" delay 48 is shown in FIGURE 4F. The "main bang" pulse to pulser 52 shown in FIGURE 4G is aligned in time with the major marker 117 of FIGURE 4A.

*Pulser*

Turning to FIGURE 6, the pulser circuit 52 is energized by a power supply, not shown, applying +800 volts to terminal 118. This +800-volt potential is divided into incremental voltages steps by a potential divider 120 connected between terminal 118 and ground. A voltage selector switch S4 taps off the desired number of these voltage increments from potential divider 120 depending on the particular application. In diagnosing brain tumors, for example, it has been determined that, using a lead zirconate titanate (PZT) crystal, the selector switch S4 should tap off approximately +480 volts from divider 120 to achieve satisfactory test results from the penetration of ultrasonic energy through the intracranial region.

The wiper of selector switch S4 selects the desired voltage, hereinafter termed B+ voltage, for application through a blocking diode D10 to a resonant charging circuit. This charging circuit includes the series combination of a charging choke L2, a resistor R48, a pair of capacitors C21 and C22 connected in parallel, and a pair of series damping resistors R49 and R50. The lower terminal of damping resistor R50 is connected to ground. The transducer 54 and a coil L3 are connected in parallel between ground and the junction of the capacitors C21, C22 and damping resistor R49. The thyratron 116 is connected at its plate to the junction between the limiting resistor R48 and the paralleled capacitors C21 and C22 while its cathode is grounded. The thyratron 116 is fired by the output from pulser driver 50 (FIGURE 5) applied to its grid through a potential divider comprising resistors R51 and R52.

In operation, the selected B+ voltage at the wiper of switch S4 charges the capacitors C21 and C22 toward the B+ voltage level; thyratron 116 being nonconductive at this point. As the charging current begins decreasing, the energy stored in the charging choke L2 is released to pump more charging current into the capacitors C21 and C22. The voltage stored on capacitors C21 and C22 approaches twice the B+ voltage. Since the voltage at the cathode of diode D10 is now in excess of the B+ potential at its anode, the diode is back-biased to disconnect the selector switch S4 from the charging circuit and the increased charge is held in capacitors C21 and C22. A capacitor C23 connected between the anode of diode D10 and ground decouples the potential divider 120 from the resonant charging circuit during the charging cycle.

On application of a triggering pulse to its grid, thyratron 116 is rendered conductive affording a low impedance path to ground for discharging capacitors C21 and C22. Discharging capacitors C21 and C22 draw current through the tank circuit comprised of coil L3, transducer 54, and the damping resistors R49 and R50. The tank circuit generates an exponentially decaying wave train at the resonant frequency of the tank circuit whose decrement is controlled by the Q of the tank circuit. The transducer in response to this electrical wave train generates mechanical vibrations which are coupled to the entrant surface of the test body. The resistor R49 in the tank circuit is adjusted to obtain the desired degree of damping of the electrical wave train ringing in the tank circuit. The electrical wave train generated by the tank circuit is also fed over line 56 to the receiver circuits for portrayal on the CRT 34 (FIGURE 1). On discharge of the capacitors C21 and C22, thyratron 116 is again nonconductive, and the charging cycle is repeated in preparation for the next triggering pulse from pulser driver 50. Resistor R48 isolates the charging choke L2 from the remainder of the pulser circuitry during conduction of the thyratron 116 to inhibit spurious resonances. The impedance of the resistor R48 is chosen to be small compared to that of the choke L2 such that during the charging cycle, the charging curve is essentially that of a pure LC circuit.

The provision of an LC charging resonant circuit rather than an RC circuit, heretofore used, constitutes an important feature of the invention. Not only does it permit the capacitors C21 and C22 to be charged to higher voltages but it also prevents the occurrence of spurious voltage pulses at the output of the pulser circuit 52 at the beginning of each charging cycle. The presence of these spurious signals, often called "ghosting," appear on the CRT 34 as vertical deflections of the trace and may mask the detection of an echo.

The reason for "ghosting" may be best appreciated by reference to FIGURE 7 where the charging curves for both an LC circuit and an RC circuit are represented. It will be noted that the LC charging curve starts out slowly in comparison to the RC curve which has a rapid initial rise. The LC circuit allows the gas in the thyratron 116 sufficient time to completely deionize prior to any appreciable buildup in the voltage at its plate. The RC charging curve, on the other hand, does not allow sufficient time for complete deionization and some of the charging current is shunted to ground through the thyratron. Thus, the RC charging curve more nearly resembles that shown in FIGURE 7 where the curve portion 122 represents that part of the charging cycle when the thyratron is rendered conductive. This disruption in the charging cycle gives rise to spurious voltage pulses at the output of pulser circuit 52 immediately following the generation of the "main bang" pulse. The LC charging circuit completely eliminates this problem.

A second important advantage obtained through the use of an LC charging circuit is that the transducer tank circuit may be pulsed at a faster rate than is possible using an RC charging circuit. As seen in FIGURE 7, it takes considerably longer for the capacitor in an RC circuit to charge to the B+ voltage than for the capacitor in an LC circuit to charge to twice the B+ voltage. Thus the capacitor in an LC circuit can be charged and discharged at a faster rate. In order to increase the charging rate of the capacitor in an RC circuit the resistor, which would replace the charging choke, would have to be decreased in resistance value. Decreasing the value of this resistor is apt to permit the thyratron current flowing at the beginning of the charging cycle to exceed the holding current rating of the more common thyratrons, thus not enabling it to revert to nonconduction. In the past, to overcome this problem and in order to attain faster pulsing rates, special and expensive tubes had to be employed.

*TCG network*

The TCG delay 74, TCG width and slope control 76 and the fine gain control cathode follower 78 of FIGURE 1 are shown in detail in FIGURE 8. The positive 200-cycle voltage spikes derived from the phase splitter 46 (FIGURES 1 and 5) are fed over line 46a to the input of the TCG delay 74. As seen in FIGURE 8, the TCG delay includes dual vacuum tube triodes V1 and V2. The plates of triodes V1 and V2 are connected to the +150-volt supply through resistors R53 and R54, respectively. The common cathode is connected to ground through a resistor R55. The input to the TCG delay 74 is coupled through a capacitor C24 to the grid of triode V1 which is biased just below cut off by a resistor R57. A capacitor C25 couples the plate of triode V1 to the grid of triode V2 which is connected by a resistor R58 and a variable pot R59 to the common cathode.

By virtue of the cross-coupling, triodes V1 and V2 operate as a monostable multivibrator with its single stable state characterized by triode V1 being nonconductive and triode V2 being conductive. On application of a positive voltage spike to the input of TCG delay 74, triode V1 goes into conductance developing a negative-going pulse at its plate which is coupled by capacitor C25 to the grid of triode V2, turning it off. Capacitor C25 discharges through resistor R58, pot R59 and resistor R55; and also triode V1 and resistor R53. The voltage level at the grid of triode V2 rises exponentially as determined by adjustment of pot R59 until such time as triode V2 conducts. Conduction through triode V2 raises the voltage at the common cathode cutting triode V1 off. The resulting fall of potential at the plate of triode V2 is differentiated by a capacitor C26 and a resistor R60 to develop a negative pulse which passes through a diode D11 to the TCG width and slope control 76.

As seen in FIGURE 8, the TCG width and slope control 76 includes a delay circuit comprising dual triodes V3 and V4, and a boot strapped sawtooth generator comprising triodes V5 and V6.

The plates of triodes V3 and V4 are connected to the +150-volt supply through resistors R61 and R62, respectively. The common cathode is grounded through a resistor R63. The plate of triode V3 is coupled to the grid of triode V4 through parallel capacitors C28 and C29. The common cathode is connected to the grid of triode V4 through a variable pot R65.

Considering the boot strapped sawtooth generator, the plate of triode V6 is connected directly to a +225-volt supply while the plate of triode V5 is connected to the positive supply through a resistor R66, a variable pot R67 and a blocking diode D14. The plate of triode V5 is tied to the grid of triode V6 and tied to ground through a capacitor C30. The cathode of triode V5 is grounded and the cathode of triode V6 is returned to −225-volt supply through a resistor R68. To provide unity feed back from the cathode to the grid of triode V6, a capacitor C31 is connected between a terminal 124 and the cathode of blocking diode D14. Resistors R69 and R70 apply a positive biasing potential to the grid of triode V5, rendering it conductive.

In operation, a negative spike passing through the blocking diode D11 from TCG delay 74 is coupled to the grid of triode V4 by parallel capacitors C28 and C29. Triode V4 is cut off and the voltage at the common cathode falls to the point where triode V3 conducts. The resulting drop in potential at the plate of triode V3 is coupled by a capacitor C32 to the grid of triode V5 to cut this triode off for the duration that triode V3 conducts.

With the shorting path through triode V5 interrupted capacitor C30 begins charging at a rate determined by variable pot R67, increasing the potential at the grid of triode V6. The positive voltage rise at the grid is duplicated at the cathode terminal 124 as triode V6 conducts. This positive rise at the cathode terminal 124 is coupled through capacitor C31 to the positive side of the variable pot R67, to maintain a constant voltage drop across this resistance element. Variable pot R67 thus functions as a constant current source pumping constant current into the capacitor C30. As a result the voltage rises at the grid and cathode of triode V6 are linear and have a slope determined by adjustment of pot R67. This linearly increasing voltage at the cathode of triode V6 is coupled by a capacitor C33 to the input grid of a pentode V7 corresponding to the gain control cathode follower 78 of FIGURE 1. A diode D15 connected between the grid of triode V6 and the +150-volt supply limits the peak amplitude of this sawtooth voltage to +150 volts.

Meanwhile, the parallel capacitors C28 and C29 connected across the triode V3 have been discharging through resistors R65, R63, R61 and triode V3 at a rate determined by the adjustment of pot R65. On reaching a predetermined voltage at the grid, triode V4 conducts, drawing sufficient current through resistor R63 to cut triode V3 off. The voltage rise at the plate of triode V3 is coupled by capacitor C32 to the grid of triode V5 to turn it on. Capacitor C30 then discharges through triode V5, terminating the sawtooth voltage at the cathode of triode V6.

It can thus be seen that the variable delay instituted by TCG delay 76 determines when the boot strap circuit will begin generating a sawtooth voltage pulse. The operation of triodes V3 and V4 determine the time duration of the sawtooth pulse while adjustment of the pot R67 in the boot strap sawtooth generator determines its slope.

The pentode cathode follower V7 is energized by the +225-volt supply connected to the plate. The grid input is made up of the sawtooth pulses at terminal 124 from the boot strap generator and a fine gain control voltage tapped from a potential divider 126 connected between +150 volts and −225 volts. This fine gain control voltage is applied through resistor R71 and paralleling diode D16 to the input grid of cathode follower V7. The cathode follower output is coupled over line 128 to the amplifying circuits of the receiver 80 of FIGURE 1. The output is also applied to the upper wiper of a gang switch S5. The number 2 contact is connected to an output line including series resistors R72 and R73, a coupling capacitor C34 and decoupling capacitor C35 shunted to ground. This output line corresponds to the line 85 in FIGURE 1 connecting the output of the cathode follower V7 to the output of video amplifier-mixer 30 to provide for direct portrayal of the output from cathode follower V7 on the face of the CRT 34.

As ultrasonic energy propagates through the material under test, it is subjected to continuous attenuation. Thus, echoes originating from flaws located remote from the transducer will be significantly less in amplitude than echoes originating from flaws located near the transducer. It becomes necessary, therefore, to resort to high gain amplification in order to insure detection of flaws located remote from the transducer. However, with constant high gain amplification, detection of high amplitude echoes will be accompanied by considerable distortion. In addition, since the "main bang" pulse is fed to the receiver, high gain amplification of this pulse would swamp the receiver.

The TCG circuits of FIGURE 8 are advantageously used in the present invention to introduce time compensated gain control signals to the amplifying circuits of the receiver 80. The voltage tapped from the potentiometer 126 serves to establish some basic amplifier gain as required. The sawtooth voltage superimposed on this basic gain control voltage functions to linearly increase amplifier gain as a function of time. Thus echoes received later in time are amplified to a greater extent.

The TCG delay 74 provides a time interval before TCG control is initiated since during this time increased amplifier gain is unnecessary. Once initiated by the TCG delay 74, the slope and width of the sawtooth function is adjusted, as previously described, in accordance with the attentuation constant of the material under test and the desired depth of inspection.

As seen in FIGURE, 8 the gang switch S5 operates when in the number 1 position to disconnect the TCG circuits from the power supply, rendering them inoperative. In the number 2 position, the output from the TCG circuits is viewed on the CRT, such as illustrated in FIGURE 2B, at which time the various adjustments in TCG circuits are made to achieve the desired sawtooth function. Switching to position number 3, the system is ready for flaw detection.

*Diagnostic application*

The application of ultrasonics to diagnostic medicine holds great promise because of its simplicity, lack of danger and discomfort to the patient, and the fact that diagnostic results can be obtained in minutes by relatively unskilled personnel. Ultrasonic inspection of the intracranial region can provide a reliable and early diagnosis of brain tumors, subdural hematomas, cerebral hemorrhage, or other space occupying lesions.

It is known that when ultrasonic energy strikes a boundary between two substances of different acoustic impedance, a portion of the energy is reflected back to the source as echoes while the remainder passes through. The fissuer or midline between the right and left lobes of the brain is such a boundary. Under normal circumstances the midline of the brain is reasonably centered within the skull. Midline displacement, on the other hand, may well indicate the presence of a space occupying lesion tending to dislocate the brain from its normal position within the skull.

The apparatus of the present invention provides a simple and convenient diagnostic tool for detecting midline displacements of the brain. Considering FIGURE 9, there is shown a double exposure photograph of the display obtained on the face of the CRT 34 using the apparatus of FIGURE 1 to detect midline displacement of the brain. The major markers 36a and markers 36b are shown laying out a range scale on the face of the CRT in the identical manner shown in FIGURE 2.

Assuming that the transducer is first placed against the left side of the patient's head, the deflection 132 coinciding with one of the major markers 36a indicates the "main bang" pulse applied to the transducer 54. The deflection 134 indicates the echo from the midline while deflection 136 corresponds to the echo from the far surface of the skull on the right side of the head. This display including deflection 132, 134, 136 and markers 36a and 36b is photographed.

The transducer 54 is then placed against the right side of the patient's head. In order to distinguish between the right and left side of the head, the connections to the vertical plates 32 and 94 are simply reversed. For this purpose a reversing switch 138 is shown in FIGURE 1 interposed in the connections to the vertical plates 32 and 94.

Similarly, vertical deflection 138 indicates that the "main bang" pulse applied to the transducer 54 held against the right side of the patient's head. Deflection 140 indicates the midline location and deflection 142 corresponds to the echo returned from the far or left side of the head.

The deflection 142 is vertically aligned with the deflection 136 on the CRT 34 by selective positioning of the transducer 54 at a point diametrically opposed to the previous point of location of the transducer at the left side of the head. This insures that the sonic energy paths in each case will be of equal length. In practice, it will be necessary for the operator, in some manner such as through memory, to refer to the previous display for the relative position of the deflection 136 in order to achieve the necessary relative position of the deflection 142.

Although the echoes from the far side of the head, in each case, are illustrated as single deflections 136 and 142 in FIGURE 9, in practice it is found that three rather distinct echoes are obtained; one originating at the inner surface of the skull, another at the boundary of the skull and the outer skin and the third originating at the outer surface of the skin. By vertically aligning the two groups of three distinct deflections, proper positioning of the transducer 54 can be achieved with a high degree of precision.

Once alignment is obtained, a second picture is taken either superimposed on the first exposure as illustrated in FIGURE 9, or on a separate portion of the film, as desired.

Since a camera is necessarily mounted over the face of the CRT 34 during this procedure, the individual conducting the test cannot readily visually monitor the operation of the system. To overcome this, a miniaturized slave scope may be provided. The slave scope, although provided with its own power supply, has its deflection plates connected in parallel through suitable isolating amplifiers with the corresponding deflection plates of the CRT 34 (FIGURE 1). The display on the face of the CRT 34 is duplicated in reduced size on the face of the slave scope. The slave scope may be readily carried in the hand and visually referred to prior to each exposure of the film to provide ready assurance that the system is functioning properly and that the displays on the face of the CRT 34 are as desired.

*Summary*

The invention thus provides a compact, portable ultrasonic inspection apparatus with the capabilities to perform flaw detection tests on a wide variety of test bodies ranging from the human body to metal objects. The system is compatible with various types of transducers 54, including quartz, lead zirconate and lithium sulfate. The system is capable of resolving echoes returned from points located in close proximity to the transducer as well as remote points. The time compensated gain control circuitry (TCG) automatically corrects for the attentuating effects of the test body on the probing ultrasonic energy and the energy returned as echoes. The improved pulser circuit 52 eliminates the presence of ghosting in the CRT display which might otherwise obscure echoes. Although a thyratron is disclosed, other types of electronic switches such as semi-conductor devices may be used. The electronically generated range scale superimposed on the face of the CRT 34 with the echo responses facilitates easy interpretation of the resulting display without parallax. All circuits are synchronized with each other to permit repetitive scanning of the CRT without any jitter in the resulting display.

As a diagnostic tool the invention can supplement or even supplant known and more complicated diagnostic techniques. Since the system is portable, tests can be performed at the patient's bedside with little discomfort to the patient and without the necessity of his removal to a special testing room. Ultrasonic energy has no known potential danger to the patient. Reliable test results can be obtained within minutes. The system is relatively inexpensive and uncomplicated and can be operated by nontechnical personnel.

The mode switches S1 through S3 of FIGURE 1 are incorporated into the system for readily converting from deflection modulation (A mode) to intensity modulation (B mode). Intensity modulation is most conducive to inspection by a scanning transducer. In the B mode of operation, trace positioning voltages are applied to the deflection plates of the CRT to account for the scanning movement of the ultrasonic transducer in order that the intensified spots appearing on the CRT are appropriately referenced with respect to the position of the transducer. In this manner, a true composite display of an entire cross-section of the test body may be obtained.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to be secured by Letters Patent is:

1. An ultrasonic inspection apparatus including
   (A) transducer means for generating and detecting ultrasonic energy in a test body,
   (B) an oscillator having a frequency determined by the velocity of the propagation of sonic energy in said test body,
   (C) a cathode ray tube,
   (D) means coupling said oscillator to said cathode ray tube for generating a range scale, said means including
      (1) a frequency divider connected to said oscillator, and (2) a mixer circuit having
(a) a first input connected to said oscillator,
(b) a second input connected to said frequency divider, and
(c) an output connected to said cathode ray tube for generating said range scale as a first series of elongated range markers resulting from the output of said frequency divider and a second series of range markers resulting from the output of said oscillator for graduating the increment between said elongated range markers, (E) synchronizing circuit means connected between said frequency divider and said transducer means, said synchronizing means including
(1) a coincident gate,
(2) a pulse generator developing pulses at a substantially reduced frequency rate relative to the frequency rate of the output from said frequency divider for enabling said coincident gate to pass at least one pulse of the output from said frequency divider each and every time said gate is enabled,
(3) a delay circuit responsive to the first pulse passed on each enabling of said coincident gate for developing a single clock pulse each and every time said coincident gate is enabled and
(4) means for selectively delaying each said clock pulse to achieve time coincidence with one of said elongated range markers,
(a) each said clock pulse operating to control the pulsing of said transducer means, (F) a receiver, said receiver
(1) being coupled to said transducer means for
(2) amplifying electrical response of said transducer means to the detection of ultrasonic echoes originating from points located within said test body and
(3) applying said amplified electrical responses to said cathode ray tube, (G) whereby said amplified electrical responses are displayed with said range scale so as to provide immediate indication of the precise location of said echo originating points.

2. The apparatus claimed in claim 1 wherein said delay circuits includes:
(a) a delay multivibrator and
(b) a high gain input transistor responsive to to the first pulse passed during each enabling of said coincident gate to provide a constant triggering pulse output to said delay multivibrator.

3. The apparatus defined in claim 1 wherein each increment between said elongated range markers corresponds to a predetermined distance of ultrasonic energy travel in said test body, and the increment between said range markers of said second series constitutes a submultiple of the increment between elongated range markers.

4. An ultrasonic inspection apparatus comprising
(A) a transducer for generating and detecting ultrasonic energy in a test body mechanically coupled thereto,
(B) a cathode ray tube,
(C) an oscillator having an output signal $f1$ of a frequency determined by the velocity of propagation of sound in said test body,
(D) a frequency divider responsive to said output signal $f1$ for developing an output signal $f2$.
(1) the output signal $f2$ having a sub-multiple frequency of output signal $f1$,
(E) a mixer-amplifier circuit having as inputs said output signals $f1$ and $f2$ and having an output terminal connected to a first vertical deflection plate of said cathode ray tube,
(1) for generating a range scale on said cathode ray tube,
(a) the graduations in said range scale corresponding to distance of ultrasonic energy propagation in said test body, (F) a synchronizing circuit including
(1) a source providing an enabling pulse input,
(2) a coincidence gate having
(a) a first input connected to said frequency divider to receive said output signal $f2$,
(b) a second input connected to receive said enabling pulse input from said source,
(i) said enabling pulse input having a frequency less than said output signal $f2$, and
(c) an output terminal at which time spaced portions of said output signal $f2$ appear,
(3) means connected to the output terminal of said gate for developing clock pulses,
(a) said clock pulses having a frequency equal to said enabling pulse input,
(4) a variable delay connected to said means for achieving time coincidence between each clock pulse and a preselected one of said graduations in said range scale, (G) pulsing means connected to said delay and synchronized by said clock pulses for repetitively pulsing said transducer to generate ultrasonic energy in said test body,
(H) a sweep circuit synchronized by said clock pulses and having outputs applied to a pair of horizontal deflection plates of said cathode ray tube for repetitively scanning the trace thereof,
(I) a receiver for amplifying the electrical responses of said transducer to the detection of ultrasonic echoes originating from points located within said test body,
(J) a gain control circuit connected to said receiver and synchronized by said clock pulses for selectively modifying the amplification of said electrical responses by said receiver so as to correct for the effects of attenuation of ultrasonic energy propagating in said test body,
(K) a first video amplifier connected to said receiver for applying said amplified electrical responses to a second vertical plate of said cathode ray tube and
(L) a second video amplifier connected to said receiver for applying said amplified electrical responses to said first vertical deflection plate of said cathode ray tube through said mixer-amplifier circuit,
(M) whereby said electrical responses are superimposed on said range scale in positional relationship therewith to indicate the location of said ultrasonic echo originating points in said test body.

5. The apparatus claimed in claim 4 which further includes
(N) switching means for
(1) disabling said first video amplifier and said mixer-amplifier circuit and
(2) connecting the output of said second video amplifier directly to the cathode of said cathode ray tube to intensity modulate the trace thereof.

6. The apparatus claimed in claim 5 which further includes
(O) a reversing switch selectively operating to connect the output of said mixer-amplifier to said vertical plate and the output from said first viedo amplifier to said first vertical deflection plate.

(References on following page)

References Cited by the Examiner
UNITED STATES PATENTS

| | | | |
|---|---|---|---|
| 2,154,386 | 4/1939 | Schlesinger | 315—23 |
| 2,398,701 | 4/1946 | Firestone | 73—67.9 |
| 2,458,771 | 1/1949 | Firestone | 73—67.8 X |
| 2,499,459 | 3/1950 | Carlin | 73—67.8 |
| 2,706,906 | 4/1955 | Rich | 73—67.5 X |
| 2,769,158 | 10/1956 | Schultz | 73—67.7 |
| 2,852,676 | 9/1958 | Joy | 331—76 |
| 2,871,404 | 1/1959 | Mugele | 73—67.7 X |
| 2,941,151 | 6/1960 | Goldbohm et al. | 343—13 X |
| 2,984,098 | 5/1961 | Loos | 73—67.9 |
| 3,009,353 | 11/1961 | Erdman | 73—67.9 |
| 3,023,611 | 3/1962 | Howry | 73—67.8 |
| 3,041,872 | 7/1962 | Brown et al. | 73—67.9 |
| 3,050,988 | 8/1962 | Grodon et al. | 73—67.5 |

OTHER REFERENCES

Kikuchi et al.: article in "The Journal of the Acoutsical Soc. of America," July 1957 issue, pp. 824–833.

Glasoe et al.: Textbook in M.I.T. Radiation Laboratory Series entitled, "Pulse Generators," pub. by McGraw-Hill Book Co., Inc., 1948, pp. 50–69, 138, 139, 340–347, 364 and 365.

RICHARD C. QUEISSER, *Primary Examiner.*

JOHN P. BEAUCHAMP, *Examiner.*

UNITED STATES PATENT OFFICE
CERTIFICATE OF CORRECTION

Patent No. 3,287,962                                          November 29, 1966

Donald P. Relyea et al.

It is hereby certified that error appears in the above numbered patent requiring correction and that the said Letters Patent should read as corrected below.

Column 8, line 73, for "An" read -- On --; column 15, line 46, for "circuits" read -- circuit --; line 48, strike out "to"; column 16, line 42, for "attentuation" read -- attenuation --; column 16, line 71, after "said", first occurrence, insert -- second --; line 72, for "viedo" read -- video --.

Signed and sealed this 12th day of September 1967.

(SEAL)
Attest:

ERNEST W. SWIDER                                  EDWARD J. BRENNER
Attesting Officer                                        Commissioner of Patents